US008116444B2

(12) United States Patent
Pearson et al.

(10) Patent No.: US 8,116,444 B2
(45) Date of Patent: Feb. 14, 2012

(54) SYSTEM AND METHOD OF PUBLISHING CONTACT INFORMATION (75) Inventors: Larry B. Pearson, San Antonio, TX (US); Aaron W. Bangor, Austin, TX (US); Jeffrey L. Brandt, Cedar Park, TX (US); James T. Miller, Austin, TX (US); Stephen M. Mueller, Austin, TX (US); Douglas F. Reynolds, Austin, TX (US)

(73) Assignee: AT&T Intellectual Property, L.P., Atlanta, GA (US)

( * ) Notice: Subject to any disclaimer, the term of this patent is extended or adjusted under 35 U.S.C. 154(b) by 1222 days.

(21) Appl. No.: 11/345,461

(22) Filed: Feb. 1, 2006

(65) Prior Publication Data

US 2007/0189503 A1 Aug. 16, 2007

(51) Int. Cl.
*H04M 3/42* (2006.01)
(52) U.S. Cl. .................................. 379/218.01
(58) Field of Classification Search .............. 705/26; 379/216.01, 355.04, 218.01
See application file for complete search history.

(56) References Cited

U.S. PATENT DOCUMENTS

| 6,480,885 | B1 | 11/2002 | Olivier |
| 2002/0023132 | A1* | 2/2002 | Tornabene et al. ........... 709/205 |
| 2002/0169650 | A1 | 11/2002 | Dougherty |
| 2003/0120500 | A1* | 6/2003 | Deeds et al. ........... 705/1 |
| 2003/0212680 | A1 | 11/2003 | Bates et al. |
| 2004/0052356 | A1* | 3/2004 | McKinzie et al. ....... 379/355.02 |
| 2004/0234045 | A1 | 11/2004 | Hora et al. |
| 2004/0267625 | A1* | 12/2004 | Feng et al. ........... 705/26 |
| 2005/0164651 | A1 | 7/2005 | Ollis et al. |
| 2005/0171799 | A1 | 8/2005 | Hull et al. |
| 2005/0289110 | A1* | 12/2005 | Giampaolo et al. ........... 707/1 |
| 2006/0293905 | A1* | 12/2006 | Ramanathan et al. ........... 705/1 |
| 2008/0109528 | A1* | 5/2008 | Knight et al. ........... 709/217 |

OTHER PUBLICATIONS

International Search Report for International Application No. PCT/US2007/00899, mailed on Feb. 7, 2008.
Written Opinion of the International Searching Authority for PCT/US2007/00899, mailed on Feb. 7, 2008.

* cited by examiner

*Primary Examiner* — Ahmad Matar
*Assistant Examiner* — Oleg Asanbayev
(74) *Attorney, Agent, or Firm* — Toler Law Group, PC (57) ABSTRACT A system and method of publishing contact information is disclosed. In a particular embodiment, the method includes receiving a command to publish a collection of contacts to a plurality of recipients, where the collection of contacts is associated with a network address book of a sender. The method also includes receiving a distribution list that identifies the plurality of recipients. Additionally, the method includes sending a notification to each of the plurality of recipients, where the notification includes an invitation to subscribe to the collection of contacts. The method also includes sending the collection of contacts to at least one of the plurality of recipients who subscribes to the collection of contacts.

15 Claims, 8 Drawing Sheets

| Subscription Name | Doe Family | 706 | | 702 |
| Published As | Doe Family | | | |
| Publisher Name | John Doe | | | |
| Email | johndoe@sbcglobal.net | | | |
| 708 Status | Pending | 722 | | |
| Date | 12/04/2005 | | | |

[Subscribe] [Decline] [Preview] [Reset]

710

Doe Family - Preview   712

| Name | Phone Number | Email | City, State |
|------|--------------|-------|-------------|
| Jane Doe | 210-555-7895 | janedoe@sbcglobal.net | San Antonio, TX |
| John Doe | 210-555-7895 | johndoe@sbcglobal.net | San Antonio, TX |
| Bambi Doe | 210-555-7895 | bambidoe@sbcglobal.net | San Antonio, TX |
| Buck Doe | 210-555-7895 | buckdoe@sbcglobal.net | San Antonio, TX |
| Bossie Doe | 210-555-8880 | | San Antonio, TX |
| Bull Doe | 210-555-8880 | | San Antonio, TX   720 |
| Minnie Doe | 210-555-1421 | minniedoe@sbcglobal.net | San Antonio, TX |
| Angus Aggie | | angus@tamu.edu | College Station, TX |

714   716   718   Showing 8 of 8 First Previous Next Last

SYSTEM AND METHOD OF PUBLISHING CONTACT INFORMATION

FIELD OF THE DISCLOSURE

The present disclosure is generally related to publishing contact information.

BACKGROUND

Electronic communications are important to business and personal relationships. Individuals can make contact through a variety of media, such as land-line telephones, cellular telephones, e-mail, personal data assistants and other computing devices, as well as by meeting at physical locations. Each medium can have unique contact information, including, for example, home telephone numbers, cellular telephone numbers, e-mail addresses, home addresses, work addresses, web addresses, and the like. Maintaining contact information associated with electronic communication devices of multiple contacts can require a written or electronic store of contact information. Additionally, as the number of contacts increases, it becomes more useful to sort the contacts into collections.

Paper-based address books are increasingly displaced by electronic versions. Yet, the variety of electronic contact information storage methods can present challenges. While contact information can be stored at individual devices, such as personal data assistants, cell phones, etc., they may not be replicated on all such devices. Thus, a user may not be able to communicate with a certain contact from an available device, unless the user can remember the necessary contact information. Moreover, the user may not be able to accommodate other individuals who request contact information for one or more of the user's contacts, unless one or all of the user's electronic devices are present. Hence, there is a need in the art to centralize storage and organization of contact information and to publish contact information to other individuals from such centralized storage.

DETAILED DESCRIPTION OF THE DRAWINGS

A system and method of publishing contact information is disclosed. In a particular embodiment, the method includes receiving a command to publish a collection of contacts to a plurality of recipients, where the collection of contacts is associated with a network address book of a sender. The method also includes receiving a distribution list that identifies the plurality of recipients. Additionally, the method includes sending a notification to each of the plurality of recipients, where the notification includes an invitation to subscribe to the collection of contacts. The method also includes sending the collection of contacts to at least one of the plurality of recipients who subscribes to the collection of contacts.

In another embodiment, a method of publishing contact information is disclosed and includes issuing a command to a server to publish a collection of contacts to a plurality of recipients, where the collection of contacts is associated with a network address book of a sender. The method also includes submitting to the server a distribution list that identifies the plurality of recipients, where each of the plurality of recipients is to receive a notification from the server. The notification includes an invitation to subscribe to the collection of contacts.

In another embodiment, a method of receiving contact information is disclosed and includes receiving a notification from a server at an electronic device of a recipient. The notification includes an invitation to subscribe to a collection of contacts that is associated with a network address book of a sender. The method also includes issuing a subscribe command to the server and receiving the collection of contacts at the electronic device.

In another embodiment, a system to publish contact information is disclosed and includes a server configured to send a notification to each of a plurality of recipients identified by a distribution list received from a sender. The notification includes an invitation to subscribe to a collection of contacts associated with a network address book of the sender.

In another embodiment, a system to receive contact information is disclosed and includes an electronic device of a recipient. The electronic device is configured to communicate with a server to receive a notification that includes an invitation to subscribe to receive access to a collection of contacts associated with a network address book of a sender.

In another embodiment, a graphical user interface (GUI) is disclosed and includes a collection identification region that includes a name of a collection of contacts associated with a network address book of a sender. The GUI also includes an indicator of a selectable option to publish the collection of contacts. The GUI also includes an editable distribution list that identifies a plurality of recipients. A notification is to be sent to each of the plurality of recipients in response to a selection of the indicator. The notification includes an invitation to subscribe to access the collection of contacts.

In another embodiment, a graphical user interface (GUI) is disclosed and includes a subscription identification region that displays to a recipient a name of a collection of contacts associated with a network address book of a sender. The GUI also includes an indicator of a selectable option for the recipient to subscribe to access the collection of contacts. The GUI also includes a contact display region to display the collection of contacts to the recipient after the indicator of the selectable option to subscribe to the collection of contacts is selected.

In another embodiment, a computer program embedded in a computer-readable medium is disclosed and includes instructions to send a notification to at least one electronic device associated with a recipient identified by a distribution list received from a sender. The notification is sent in response to receipt of a command to publish a collection of contacts associated with a network address book of the sender. The notification includes an invitation to subscribe to receive access to the collection of contacts.

Figure 1:
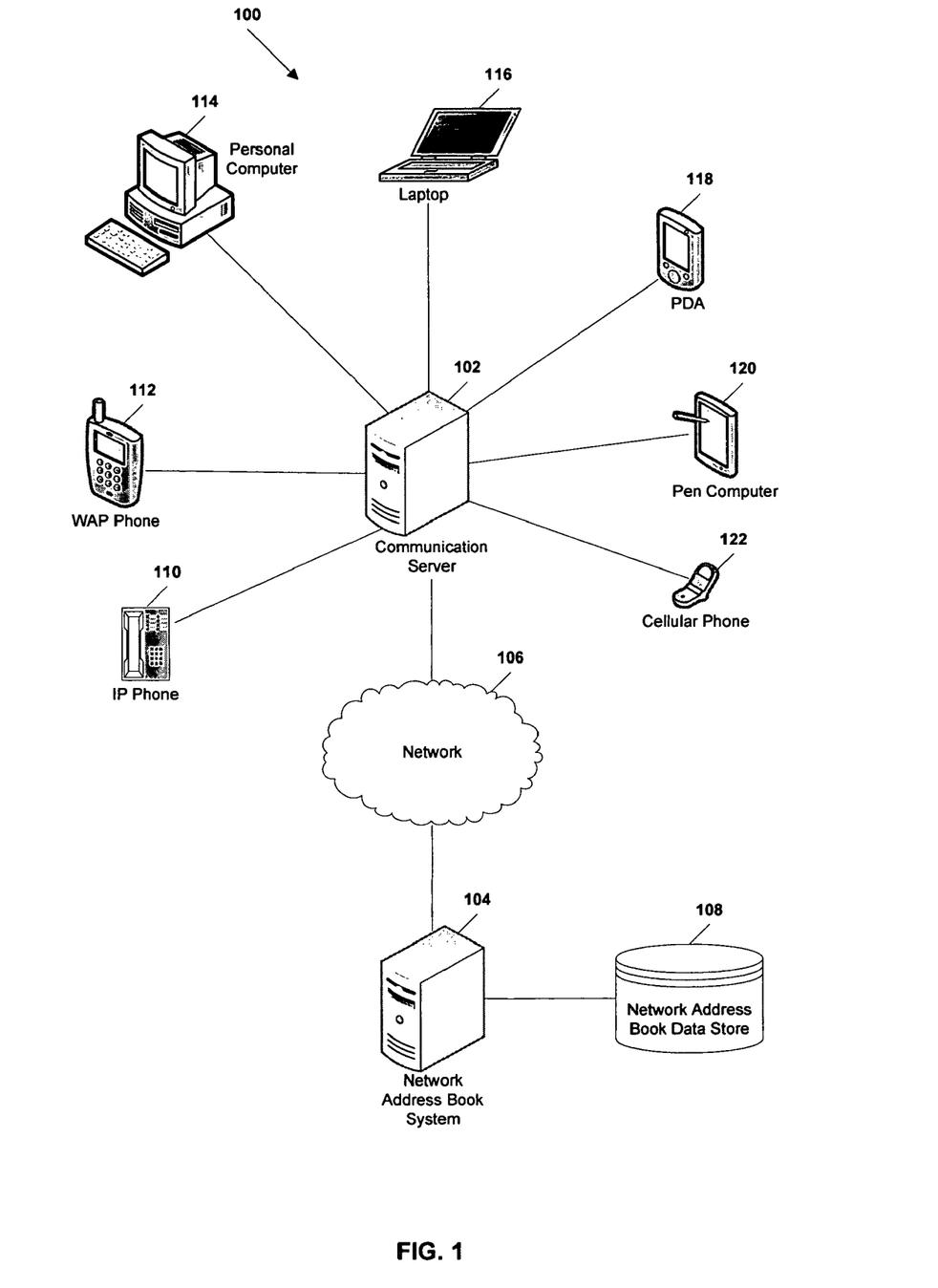
FIG. 1 is a block diagram illustrating a particular embodiment of a system to publish contact information.

Referring to FIG. 1, an illustrative embodiment of a system to publish contact information is illustrated and is generally designated 100. As shown, the system 100 includes a communication server 102 that communicates with a plurality of electronic devices 110-122. For example, the communication server 102 can communicate with one or more Internet Protocol (IP) phones 110, one or more wireless access protocol (WAP) phones 112, one or more personal computers 114, one or more laptop computers 116, one or more personal data assistants (PDAs) 118, one or more stylus or pen-operated computers 120, one or more cellular phones 122, or any combination thereof. The electronic devices 110-122 can belong to a single user or to multiple users.

As illustrated in FIG. 1, the communication server 102 can communicate with a network address book system server 104 via a network 106. In a particular embodiment, the network address book system server 104 can store network address books associated with a plurality of users. In another embodiment, the network address book system server 104 can communicate with an external network address book data store 108 that stores the network address books.

Each network address book includes contact information for contacts of a user. In a particular embodiment, a network address book can include information and meta-information stored as entries in the network address book. An entry can correspond to a contact or communications partner, such as a person or organization, and can include contact information related to multiple devices or communications accounts used by the contact or communications partner. In an illustrative embodiment, contact information of each contact or communications partner can be organized in collections or groups.

Collections of contacts can be arranged and organized in any manner suitable to identify a subset of all contacts in a network address book. For example, a collection of contacts can include one or more physical addresses, phone numbers, e-mail addresses, other contact information, or any combination thereof, related to all contacts or communications partners whose names begin with a certain letter. In another example, a collection of contacts can include one or more physical addresses, phone numbers, e-mail addresses, other contact information, or any combination thereof, related to all contacts or communications partners belonging to a single organization. In another example, a collection of contacts can include one or more physical addresses, phone numbers, e-mail addresses, other contact information, or any combination thereof, related to all business contacts of a user.

In a particular embodiment, each electronic device 110-122 of a single user can be associated with the user's network address book at the network address book system server 104. A copy of the network address book can be stored at each of the electronic devices 110-122, and such copies can be synchronized among various electronic devices 110-122 associated with the user by synchronization rules executed at the network address book system server 104. Additionally, contact information within a user's network address book can be transcoded or otherwise converted between formats at the network address book system server 104, such that copies of the network address book can be presented at various electronic devices 110-122.

In another embodiment, a user can operate a copy or version of a network address book software application at each electronic device 110-122. In this embodiment, the network address book software application can convert contact information of the user's network address book into a format suitable to display the contact information at the particular electronic device on which the network address book software application is operated. Additionally, the network address book software application can convert contact information, commands, and other information input by the user at each electronic device 110-122 into a format suitable to be read, stored, or executed by the communication server 102, the network address book system server 104, the network address book data store 108, or any combination thereof. In an illustrative embodiment, the network address book software application can present a graphical user interface (GUI), such as those described with reference to FIGS. 6 and 7.

In a particular embodiment, a user of a network address book stored by the network address book data store 108 can publish a collection of contacts included in the user's network address book to one or more recipients. The user can access a copy of his or her network address book at an electronic device 110-122 that communicates with the network address book system server 104 via the communication server 102 and the network 106. The user can select a collection of contacts from the network address book via the electronic device 110-122 and can issue a command to publish the collection of contacts.

The network address book system server 104 receives the command to publish the collection of contacts. In an illustrative embodiment, the network address book system server 104 can prompt the user to input a distribution list that includes recipients to whom the user desires to send the collection of contacts. The user can input or select the recipients via the electronic device 110-122 and send the distribution list to the network address book system server 104. In a particular embodiment, upon receiving the distribution list, the network address book system server 104 can send a notification to each recipient on the distribution list. The notification can include an invitation to subscribe to the collection of contacts. The network address book system server 104 can receive subscribe or decline commands from the recipients and can send copies of the collection of contacts, such as read-only files containing data related to the collection of contacts, to one or more electronic devices 110-122 associated with each recipient that subscribes to the collection of contacts. In an illustrative embodiment, the network address book system server 104 can instruct the network address book data store 108 to associate the collection of contacts with a network address book corresponding to each user who subscribes to the collection of contacts.

In a particular embodiment, upon receiving the distribution list, the network address book system server 104 can determine whether each recipient on the distribution list is a customer or subscriber of a service associated with the network address books stored by the network address book system server 104 or the network address book data store 108. In this embodiment, the network address book system server 104 can prompt the user to input an e-mail address or other contact information for each non-customer or non-subscriber of the service. The network address book system server 104 sends an automated message to each of the non-customer or non-subscriber recipients using the contact information that the network address book system server 104 receives from the user. The automated message includes an invitation to become a customer or subscriber of the service. In an illustrative embodiment, the network address book system server 104 can send a notification that includes an invitation to subscribe to the collection of contacts to the recipient after the recipient becomes a customer or subscriber of the service.

In an illustrative, non-limiting embodiment, a recipient who receives a notification that includes an invitation to subscribe to a collection of contacts can issue a command to the network address book system server 104 via the recipient's electronic device 110-122 indicating that the recipient desires to preview the collection of contacts before subscribing to or declining access to the collection of contacts. The network address book system server 104 can send contact information associated with one or more of the contacts in the collection of contacts to the recipient's electronic device 110-122 in response to receiving a selection to preview the collection of contacts designated in the invitation to the recipient.

Figure 2:
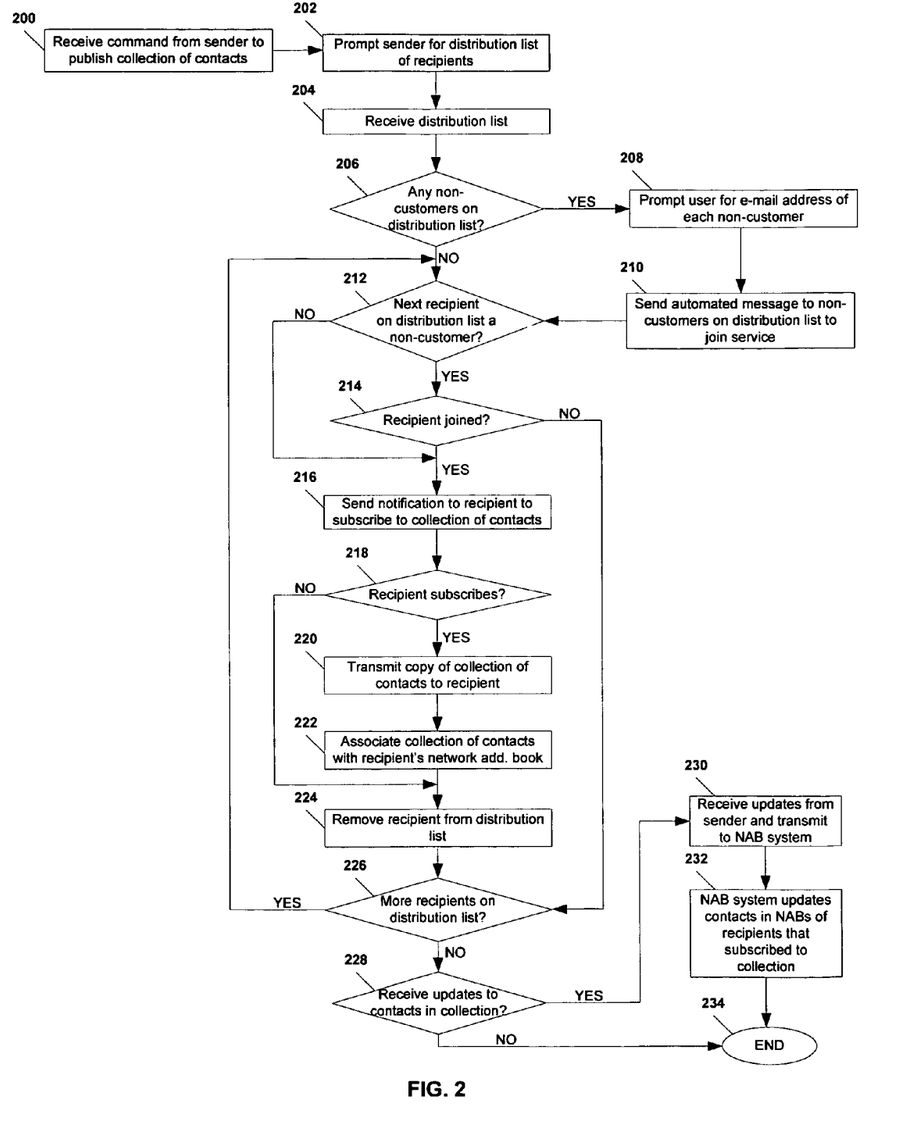
FIG. 2 is a flow diagram illustrating a particular embodiment of a method of publishing contact information.

Referring to FIG. 2, an illustrative embodiment of a method of publishing contact information is shown. At block 200, a server receives a command from a sender to publish a collection of contacts associated with a network address book of the sender that is stored at the server or at a data store coupled to the server. In an illustrative embodiment, the server can be a network address book system server, such as that shown in FIG. 1. The sender can issue the command via a network address book software application executed on an electronic device that communicates with the network address book system server via a network, such as an intranet, the Internet, or a wireless network. In an illustrative embodiment, the electronic device can communicate with a communication server that communicates with the network address book system server via the network, as shown in FIG. 1.

Moving to block 202, the server prompts the sender to input a distribution list that includes the recipients to whom the sender desires to publish the collection of contacts. Continuing to block 204, the server receives the distribution list from the sender. In an illustrative embodiment, the sender can type the names of the recipients at the electronic device. In another embodiment, the sender can select the names of the recipients from a list, such as a pull-down or drop-down menu on a graphical user interface displayed by the electronic device. Alternatively, the sender can send a file that includes the distribution list.

In a particular embodiment, the method proceeds to decision step 206, and the server determines whether any recipients on the distribution list are non-customers or non-subscribers of a network address book service. If any recipient is a non-customer or non-subscriber, the method moves to block 208, and the server prompts the sender to input contact information, such as an e-mail address, for each non-customer or non-subscriber. The method then proceeds to block 210, and the server sends an automated message to the non-customer or non-subscriber, which can include an invitation to join the service. The method then continues to decision step 212.

Returning to decision step 206, if the distribution list includes no non-customers or non-subscribers of the network address book service, the method moves to decision step 212. At decision step 212, the server determines whether the next recipient on the distribution list is a non-customer or non-subscriber of the network address book service. If the next recipient is a customer of the service, the method proceeds to bock 216. Conversely, if the next recipient is a non-customer or non-subscriber, the method continues to decision step 214, and the server determines whether the recipient has joined the service. For example, the server can determine whether a sign-up command has been received. If the recipient has joined the service, the method moves to block 216. If the recipient has not joined, on the other hand, the method proceeds to decision step 226 and continues as described.

At block 216, the server sends a notification to the recipient that which includes an invitation to subscribe to the collection of contacts that the sender has selected to publish, such that the recipient can access and view the collection of contacts. The method moves to decision step 218, and the server determines whether the recipient has subscribed to the collection of contacts. In an illustrative embodiment, the server can send the notification to an electronic device associated with the recipient at the server or at an external network address book data store, and the recipient can issue a subscribe command or a decline command to the server via the electronic device.

If the recipient does not subscribe to the collection of contacts, the method proceeds to block 224 and continues as described. On the other hand, if the recipient subscribes to the collection of contacts, the method moves to block 220, and the server transmits a copy of the collection of contacts to the recipient. In a particular embodiment, the server can retrieve the collection of contacts from an external network address book data store and transmit a copy of the collection of contacts to the electronic device to which the notification was sent. In another embodiment, the server can transmit the copy of the collection of contacts to one or more other electronic devices associated with the recipient.

In a particular embodiment, the method proceeds to block 222, and the server associates the collection of contacts with the recipient's network address book. In another embodiment, the server can issue a command to an external network address book data store to associate the collection of contacts with the recipient's network address book.

Proceeding to block 224, the recipient is removed from the distribution list at the server. Continuing to decision step 226, the server determines whether additional recipients are on the distribution list. If additional recipients are on the distribution list, the method returns to decision step 212. Whereas, if no additional recipients remain on the distribution list, the method proceeds to decision step 228.

At decision step 228, the server determines whether it has received updates from the sender to contacts in the published collection. If no updates are received from the sender, the method terminates at 234. On the other hand, if updates are received from the sender, the method moves to block 230, and the server transmits the updates to the network address book system server. Continuing to block 232, the network address book system server updates the contacts in the network address books of each recipient that subscribed to the collection. The method terminates at 234.

Figure 3:
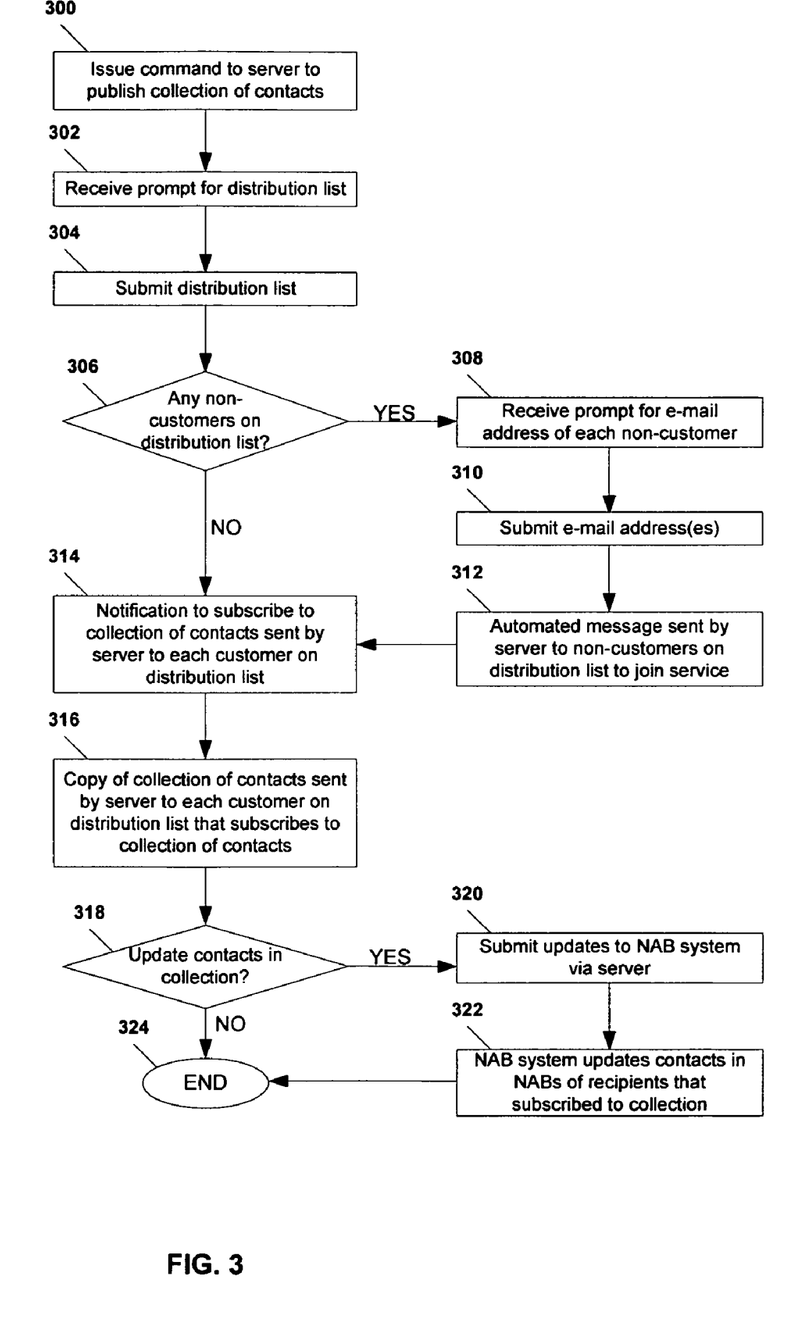
FIG. 3 is a flow diagram illustrating a second particular embodiment of a method of publishing contact information.

Referring to FIG. 3, a second illustrative embodiment of a method of publishing contact information is shown. At block 300, a sender issues a command to a server to publish a collection of contacts. In an illustrative embodiment, the server can be a network address book system server, such as that shown in FIG. 1. The sender can issue the command via a network address book software application executed on an electronic device that communicates with the network address book system server via a network, such as the Internet or a wireless network. In an illustrative embodiment, the electronic device can communicate with a communication server that communicates with the network address book system server via the network, as shown in FIG. 1.

Moving to block 302, the sender receives a prompt to input a distribution list that includes the recipients to whom the sender desires to publish the collection of contacts. Continuing to block 304, the sender submits the distribution list to the server. In an illustrative embodiment, the sender can type the names of the recipients at the electronic device. In another embodiment, the sender can select the names of the recipients from a list, such as a pull-down or drop-down menu on a graphical user interface displayed by the electronic device. Alternatively, the sender can send a file that includes the distribution list.

In a particular embodiment, the method proceeds to decision step 306, and the server determines whether any recipients on the distribution list are non-customers or non-subscribers of a network address book service. If any recipient is a non-customer or non-subscriber, the method moves to block

308, and the sender receives a prompt to input contact information, such as an e-mail address, for each non-customer or non-subscriber. The method then proceeds to block 310, and the sender submits the contact information to the server. The method then continues to block 312, and each non-customer or non-subscriber is sent an automated message by the server, which contains an invitation to join the network address book service. The method then proceeds to block 314 and continues.

Returning to decision step 306, if the distribution list includes no non-customers or non-subscribers of the network address book service, the method moves to block 314. At block 314, a notification is sent to each customer on the distribution list. The notification includes an invitation to subscribe to the collection of contacts, such that the recipient can access and view the collection of contacts. In an illustrative embodiment, the server can send the notification to one or more electronic devices associated with the recipient at the server or at an external network address book data store. The recipient can receive the notification at the electronic device(s) and issue a subscribe command or a decline command to the server via the electronic device.

Continuing to block 316, a copy of the collection of contacts is sent to each recipient that subscribes to the collection of contacts. In a particular embodiment, the server can retrieve the collection of contacts from an external network address book data store and transmit a copy of the collection of contacts to the electronic device(s) to which the notification was sent. In another embodiment, the server can transmit the copy of the collection of contacts to one or more other electronic devices associated with the recipient.

Proceeding to decision step 318, the sender can update contacts in the published collection. If the sender decides not to update the contacts, the method terminates at 324. Conversely, if the sender decides to update the contacts, the method moves to block 320, and the sender submits updates to the network address book system via the server. Continuing to block 322, the NAB system updates the contacts in the network address books of those recipients that subscribed to the collection of contacts published by the sender. The method terminates at 324.

Figure 4:
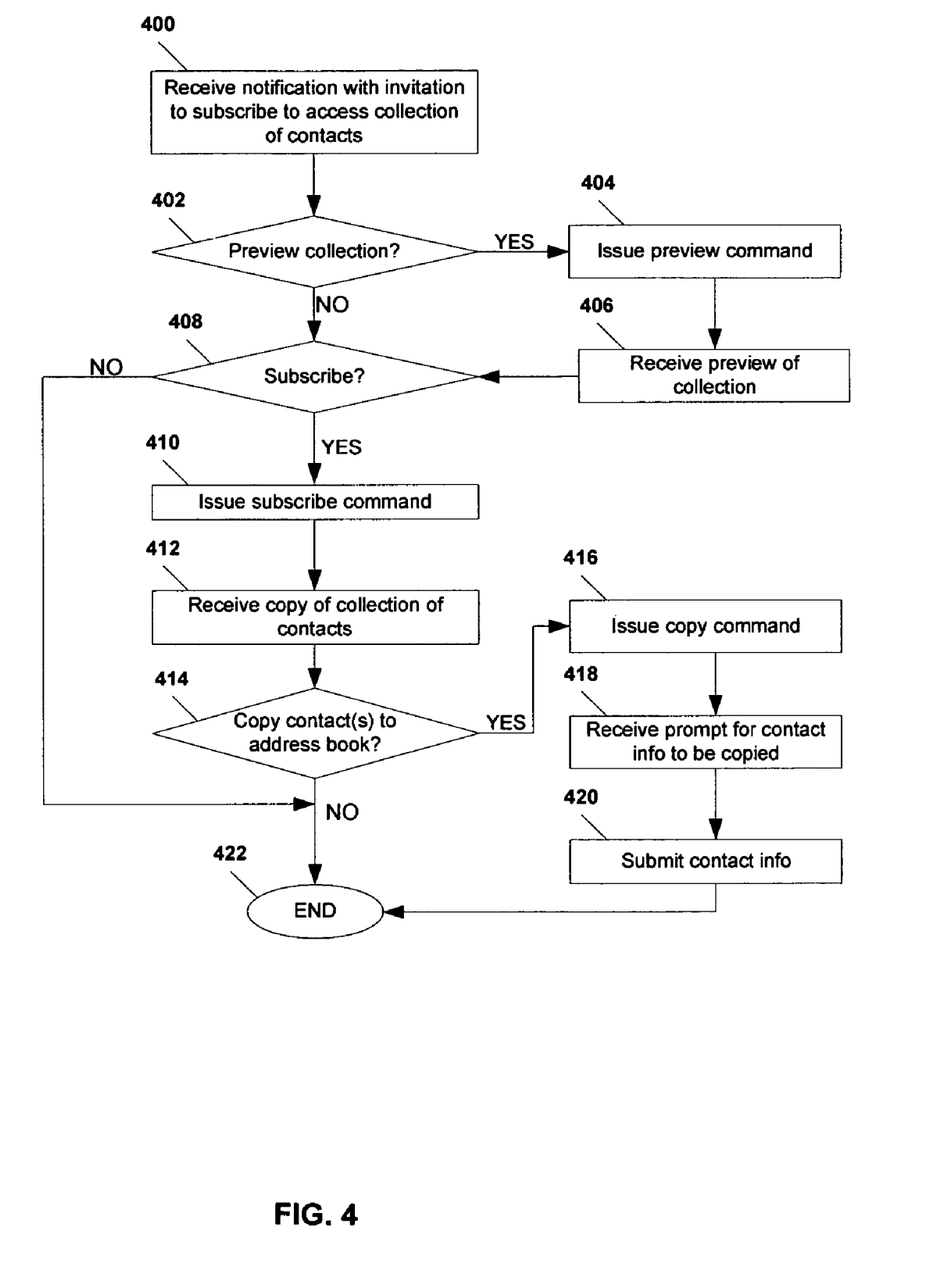
FIG. 4 is a flow diagram illustrating a particular embodiment of a method of receiving contact information.

Referring to FIG. 4, an illustrative embodiment of a method of receiving contact information is shown. At block 400, a recipient receives a notification from a server that includes an invitation to subscribe to a collection of contacts published by a sender, such that the recipient can access and view the collection of contacts. In a particular embodiment, the recipient can receive the notification from a network address book server at an electronic device that is associated with the recipient at the server or at an external network address book data store. In an illustrative embodiment, the notification can be displayed via a graphical user interface of a network address book software application operating at the electronic device.

Moving to decision step 402, the recipient can determine whether to preview the collection of contacts. If the recipient decides not to preview the collection of contacts, the method continues to decision step 408 and continues. Conversely, if the recipient decides to preview the collection of contacts, the method moves to block 404, and the recipient issues a preview command to the server via the electronic device. In an illustrative embodiment, the recipient can issue a preview command by selecting a selectable option indicator that corresponds to the preview command, such as a button presented by software or menu selection on a graphical user interface of a network address book software application operating at the electronic device. The recipient receives a preview of the collection of contacts at block 406. In an example embodiment, the preview can include contact information related to one or more of the contacts in the collection of contacts. The method then proceeds to decision step 408.

At decision step 408, the recipient determines whether to subscribe to the collection of contacts. If the recipient decides not to subscribe to the collection of contacts, the method terminates at 422. On the other hand, if the recipient decides to subscribe to the collection of contacts, the method continues to block 410, and the recipient issues a subscribe command to the server. In an illustrative embodiment, the recipient can issue a subscribe command or a decline command to the server, for example, by selecting a button presented by software or other selectable option indicator at the electronic device to which the notification was sent or from another electronic device associated with the recipient.

Proceeding to block 412, the recipient receives a copy of the collection of contacts. In a particular embodiment, the server can retrieve the collection of contacts from an external network address book data store and transmit a copy of the collection of contacts to the electronic device to which the notification was sent. In another embodiment, the server can transmit the copy of the collection of contacts to one or more other electronic devices associated with the recipient.

Moving to decision step 414, in a particular embodiment, the recipient determines whether to copy contact information of one or more contacts in the collection of contacts into a network address book associated with the recipient at the server or at an external data store coupled to the server. If the recipient decides not to copy any of the contact information in the collection of contacts, the method terminates at 422. Conversely, if the recipient decides to copy contact information of one or more contacts in the collection of contacts, the method proceeds to block 416.

At block 416, the recipient can issue a copy command to the server via the electronic device, for example, by selecting a menu item or other selectable option indicator at the electronic device to which the notification was sent or from another electronic device associated with the recipient. Moving to block 418, the recipient receives a prompt to indicate the contact information that is to be copied. Continuing to block 420, the recipient submits the contacts that are to be copied. In an illustrative embodiment, the recipient can indicate which contacts are to be copied by clicking on them with a mouse pointer, by highlighting them with a movable highlight bar, by any other method suitable for selecting items displayed by a graphical user interface, or any combination thereof. The server can copy, or instruct an external network address book data store to copy, the contact information selected by the recipient to a network address book associated with the recipient. In a particular embodiment, the recipient can indicate that all contact information in the collection of contacts is to be copied by selecting a selectable option indicator corresponding to all contacts in the collection of contacts, and the server can associate the entire collection of contacts with the recipient's network address book. The method terminates at 422.

Figure 5:
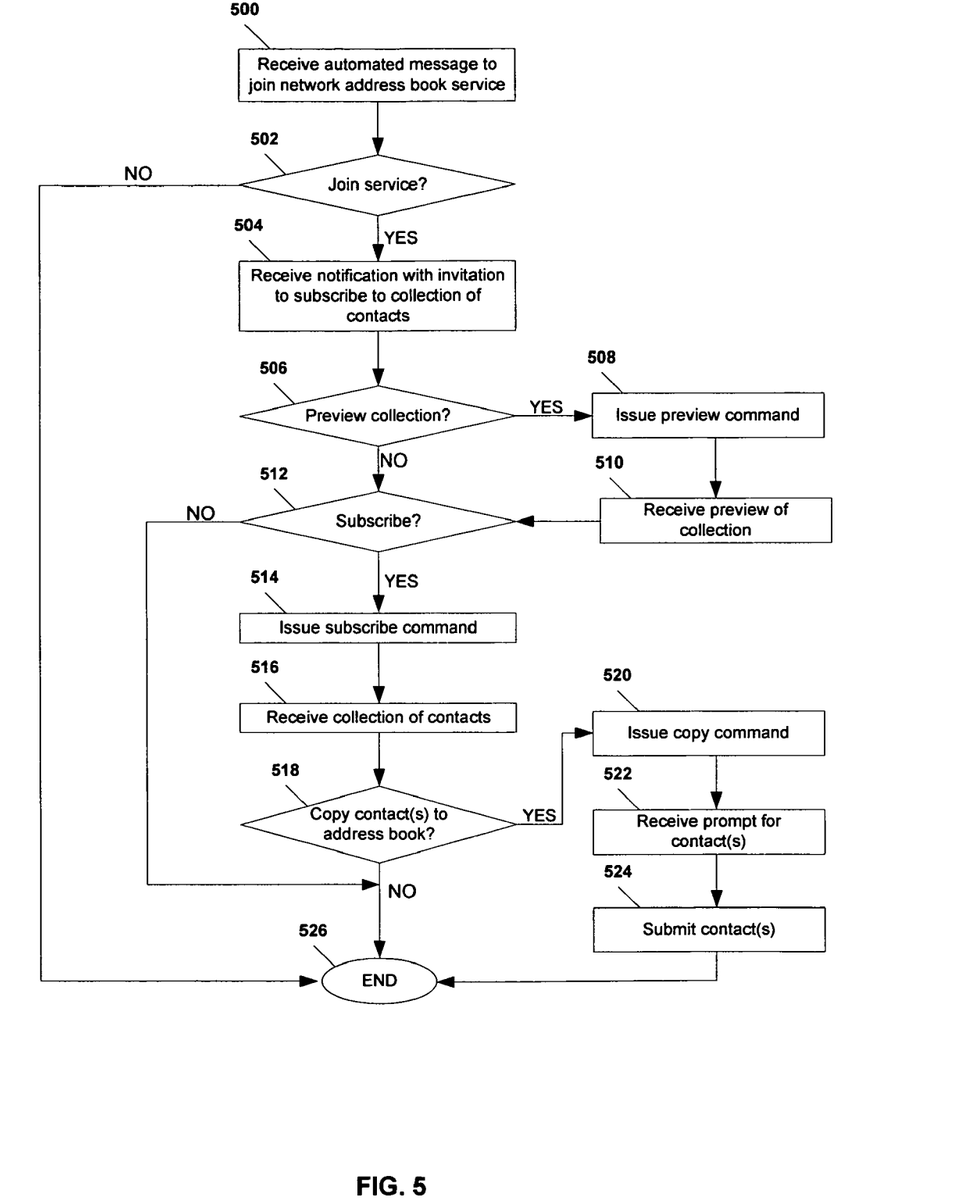
FIG. 5 is a flow diagram illustrating a second particular embodiment of a method of receiving contact information.

Referring to FIG. 5, an illustrative embodiment of a method of receiving contact information is shown. At block 500, a recipient receives an automated message from a network address book server, which includes an invitation to join a network address book service. In an illustrative embodiment, the recipient can receive the automated message via an e-mail address provided by a sender that chooses to publish a collection of contacts to the recipient. Moving to decision step 502, the recipient determines whether to join the service. If the recipient does not join the service, the method terminates at 526. On the other hand, if the recipient joins the service, the method proceeds to block 504.

At block 504, the recipient receives a notification that includes an invitation to subscribe to the collection of contacts published by the sender, such that the recipient can access and view the collection of contacts. In a particular embodiment, the recipient can receive the notification from a network address book server at an electronic device that is associated with the recipient at the server or at an external network address book data store. In an illustrative embodiment, the notification can be displayed via a graphical user interface of a network address book software application operating at the electronic device.

Moving to decision step 506, the recipient can determine whether to preview the collection of contacts. If the recipient decides not to preview the collection of contacts, the method continues to decision step 512 and continues as described. Conversely, if the recipient decides to preview the collection of contacts, the method moves to block 508, and the recipient issues a preview command to the server. In an illustrative embodiment, the recipient can issue a preview command by selecting a selectable option indicator that corresponds to the preview command, such as a button presented by software or menu selection. The recipient receives a preview of the collection of contacts at block 510. In an exemplary embodiment, the preview can include contact information related to one or more of the contacts in the collection of contacts. The method then proceeds to decision step 512.

At decision step 512, the recipient determines whether to subscribe to the collection of contacts. If the recipient decides not to subscribe to the collection of contacts, the method terminates at 526. On the other hand, if the recipient decides to subscribe to the collection of contacts, the method continues to block 514, and the recipient issues a subscribe command to the server. In an illustrative embodiment, the recipient can issue a subscribe command or a decline command to the server, for example, by selecting a button presented by software or other selectable option indicator at the electronic device to which the notification was sent or from another electronic device associated with the recipient.

Proceeding to block 516, the recipient receives a copy of the collection of contacts. In a particular embodiment, the server can retrieve the collection of contacts from an external network address book data store and transmit a copy of the collection of contacts to the electronic device to which the notification was sent. In another embodiment, the server can transmit the copy of the collection of contacts to one or more other electronic devices associated with the recipient.

Moving to decision step 518, in a particular embodiment, the recipient determines whether to copy contact information of one or more contacts in the collection of contacts into a network address book associated with the recipient at the server or at an external data store coupled to the server. If the recipient decides not to copy any of the contact information in the collection of contacts, the method terminates at 526. Conversely, if the recipient decides to copy contact information of one or more contacts in the collection of contacts, the method proceeds to block 520.

At block 520, the recipient can issue a copy command to the server via the electronic device, for example, by selecting a menu item or other selectable option indicator at the electronic device to which the notification was sent or from another electronic device associated with the recipient. Moving to block 522, the recipient receives a prompt to indicate the contact information that is to be copied. Continuing to block 524, the recipient submits the contacts that are to be copied. In an illustrative embodiment, the recipient can indicate which contacts are to be copied by clicking on them with a mouse pointer, by highlighting them with a movable highlight bar, by any other method suitable for selecting items displayed by a graphical user interface, or any combination thereof. The server can copy, or instruct an external network address book data store to copy, the contact information selected by the recipient to a network address book associated with the recipient. In a particular embodiment, the recipient can indicate that all contact information in the collection of contacts is to be copied by selecting a selectable option indicator corresponding to all contacts in the collection of contacts, and the server can associate the entire collection of contacts with the recipient's network address book. The method terminates at 526.

Though the aspects of the disclosed methods have been presented in a certain order, for ease of description, certain portions of the method may be performed in a different order or simultaneously.

Figure 6:
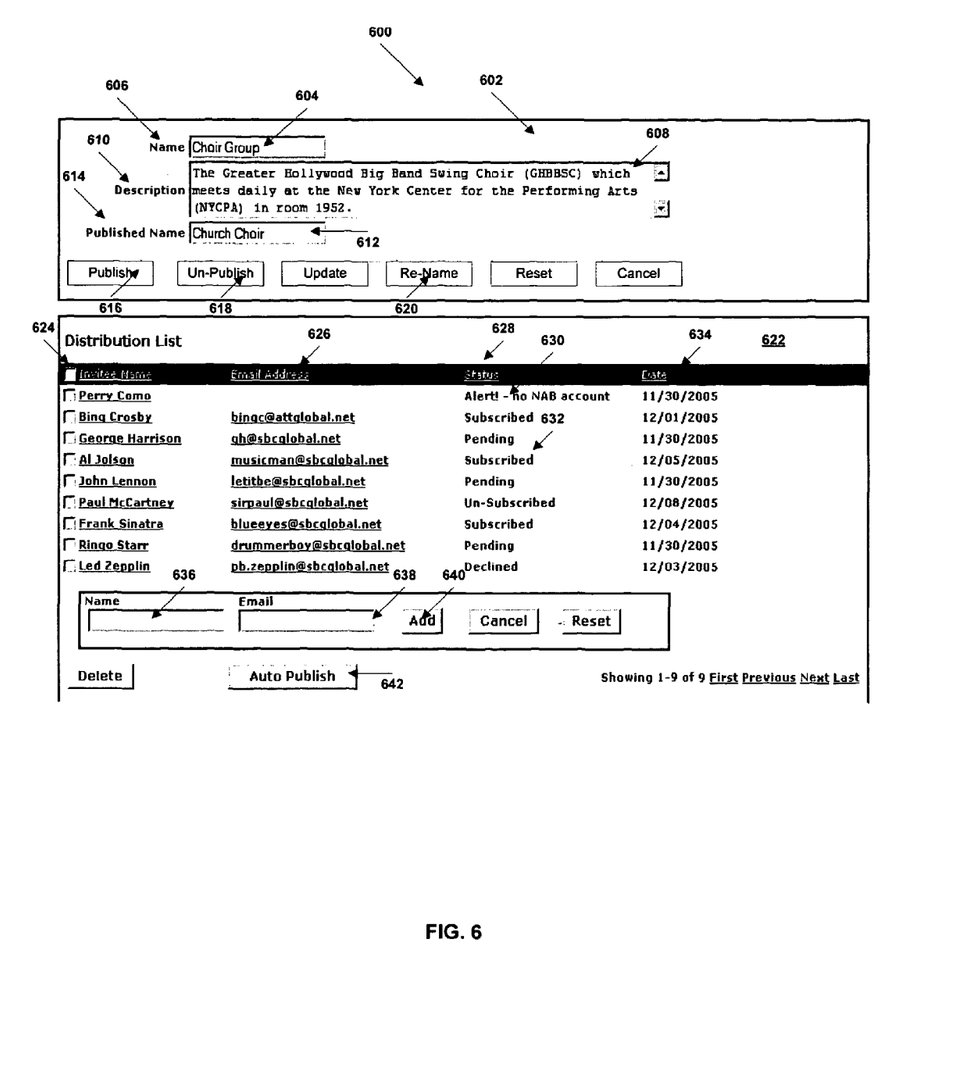
FIG. 6 is a diagram illustrating a particular embodiment of a graphical user interface (GUI) to publish contact information.

Referring to FIG. 6, a particular embodiment of a graphical user interface (GUI) to publish contact information is illustrated and designated generally at 600. As shown in FIG. 6, the GUI can include a collection identification region 602 that includes a name 604 of a collection of contacts associated with a network address book of a sender. In an illustrative embodiment, the name 604 can be selectable from a plurality of names using a drop down menu or pull down menu within the collection identification region 602. Alternatively the name 604 can be manually typed into a name field 606.

In a particular embodiment, the collection identification region 602 can also include a description 608 of the named collection of contacts. In one embodiment, the description can be manually typed into a description field 610. In another embodiment, the description can be associated with the collection of contacts within the sender's network address book and can appear in the description field 610 when the name 604 of the collection of contacts is selected or typed into the name field 606.

In an illustrative embodiment, the collection identification region 602 can also include a published name 612 of the named collection of contacts. For example, the sender can select a button presented by software 620 marked "Re-Name," in order to publish the collection of contacts under a name other than the name used in the sender's network address book. The published name 612 can be manually typed into a published name field 614.

The collection identification region 602 can include a plurality of selectable option indicators, such as buttons presented by software 616-620. The selectable option indicators can include, for example, a "Publish" option indicator 616, which the sender can select in order to publish the named collection of contacts, and an "Un-Publish" option indicator 618, which the sender can select to retract or interrupt publishing of the named collection of contacts.

The GUI 600 can also include a distribution list region 622. In a particular embodiment, the sender can be prompted to input a distribution list when the "Publish" option indicator 616 is selected. The distribution list region 622 can include a recipient name list 624. Each name included in the recipient name list 624 can be selected from a menu. Alternatively, in an illustrative embodiment, each name can be typed into a name field 636 within the distribution list region 622, and the name can be added to the recipient name list 624 by selecting an "Add" indicator 640.

In a particular embodiment, the distribution list region 622 can include a list of e-mail addresses 626 or other contact information that will be used to send a an invitation to subscribe to the collection of contacts, an invitation to join a network address book service, or a combination thereof. E-mail addresses included in the e-mail address list 626 can be typed into an e-mail address field 638 within the distribution list region 622. Alternatively, e-mail addresses related to recipients that are customers or subscribers of the network address book service can be filled in automatically within the e-mail address list 626, while the sender can be prompted to manually enter e-mail addresses of non-customers or non-subscribers.

In an illustrative embodiment, the distribution list region 622 can include a status listing 628 that displays status information related to each recipient in the recipient name list 624. For example, the status listing 628 can display a non-customer indicator 630 that indicates that the recipient is not a customer or subscriber of a network address book service. In another example, the status listing 628 can display a subscribed indicator 632 that indicates that the recipient has subscribed to the named collection of contacts. In a particular embodiment, the distribution list region 622 can include a date list 634 that indicates a date of an invitation to join the network address book service or a date of an invitation to subscribe to the collection of contacts for each recipient in the recipient name list 624. Alternatively, the date list 634 can include a date of the status listed in the status listing 628 for each recipient in the recipient name list 624.

In an illustrative embodiment, the distribution list region 622 can include a selectable option indicator, such as an "AutoPublish" indicator 642, which indicates that the sender has completed the distribution list and desires to publish the named collection of contacts to the recipients listed in the distribution list region 622.

Figure 7:
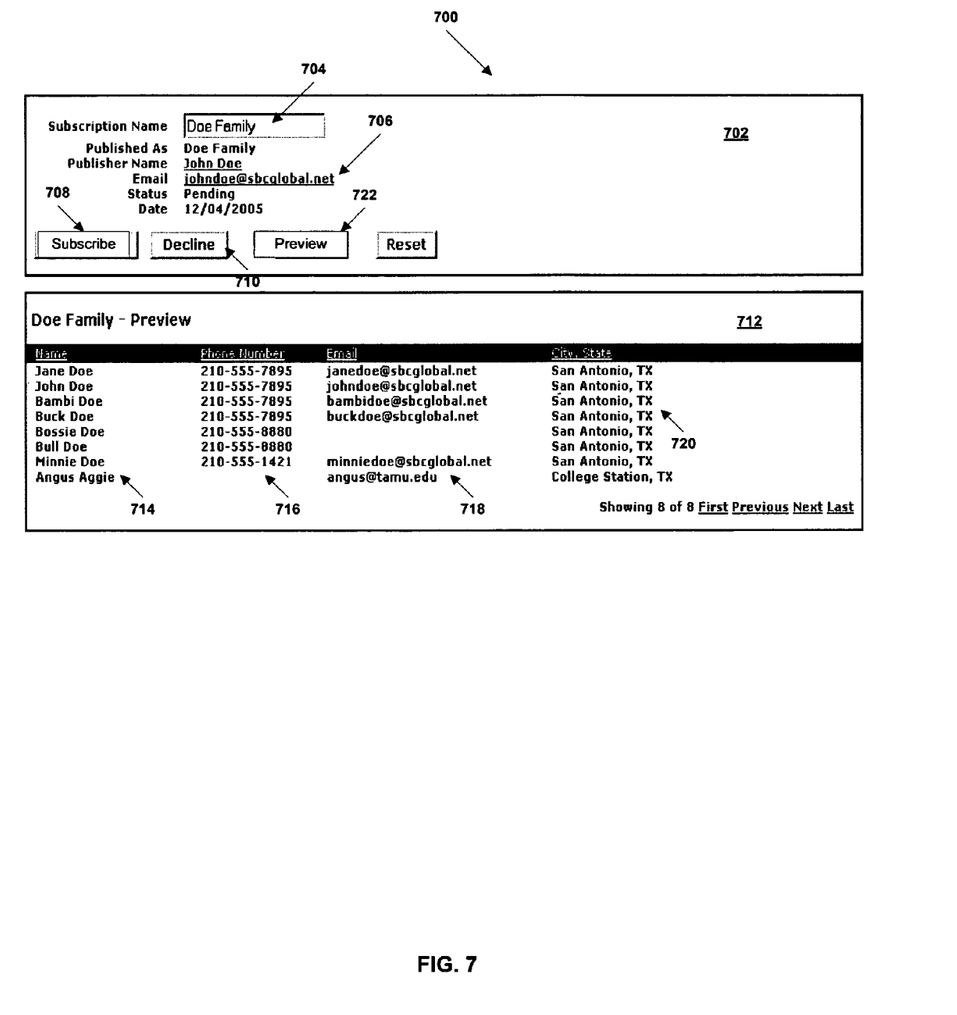
FIG. 7 is a diagram illustrating a particular embodiment of a graphical user interface (GUI) to receive contact information.

FIG. 7 a particular embodiment of a graphical user interface (GUI) to receive contact information is illustrated and designated generally at 700. The GUI 700 can include a subscription identification region 702 that includes a name 704 of a collection of contacts that a sender has chosen to publish. The subscription identification region 702 can include sender information 706 that includes, for example, a sender name, a sender user name, a sender e-mail address, sender contact information, a date that the sender chose to publish the collection of contacts, a date on which the recipient was invited to subscribe to the collection of contacts, or any combination of the above.

In a particular embodiment, the subscription identification region 702 can include a plurality of selectable option indicators, such as buttons presented by software 708-710, and 722. The selectable option indicators can include, for example, a "Subscribe" option indicator 708, which the recipient can select in order to access and view the named collection of contacts, or to associate the named collection of contacts with a network address book of the recipient. The selectable option indicators can include, in another example, a "Decline" option indicator 710, which the recipient can select in order to decline access to the named collection of contacts. In an illustrative embodiment, the selectable option indicators can include a "Preview" option indicator 722, which the recipient can select in order to preview the named collection of contacts before subscribing to or declining the collection of contacts.

The GUI 700 can also include a contact display region 712. In a particular embodiment, the contact display region 712 can display contact information for contacts included in the named collection of contacts. For example, the contact display region 712 can display names 714 of the contacts, phone numbers 716 of the contacts, e-mail addresses 718 of the contacts, physical addresses or locations 720 of the contacts, or any combination thereof. In an illustrative embodiment, the contact display region 712 can display contact information related to contacts in the named collection of contacts after the recipient subscribes to the collection of contacts, by selecting the "Subscribe" option indicator 708. In another embodiment, the contact display region 712 can display contact information related to all, or less than all, of the contacts in the named collection of contacts, in response to a selection of the "Preview" option indicator 722.

In conjunction with the configuration of structure described herein, the system and method disclosed provide a means for customers of a network address book service to share selected lists of contacts with other parties. A customer wanting to share a list of contacts with other parties publishes the list of contacts to selected recipients, and the recipients receive an invitation to subscribe to the published list of contacts. Publishing can also extend to non-customers or non-subscribers of the network address book service, whereby the non-customers or non-subscribers are invited to join the service before receiving the selected list of contacts. The system and method disclosed provide parties with a way to take advantage of each other's contacts through an efficient contact exchange process.

Figure 8:
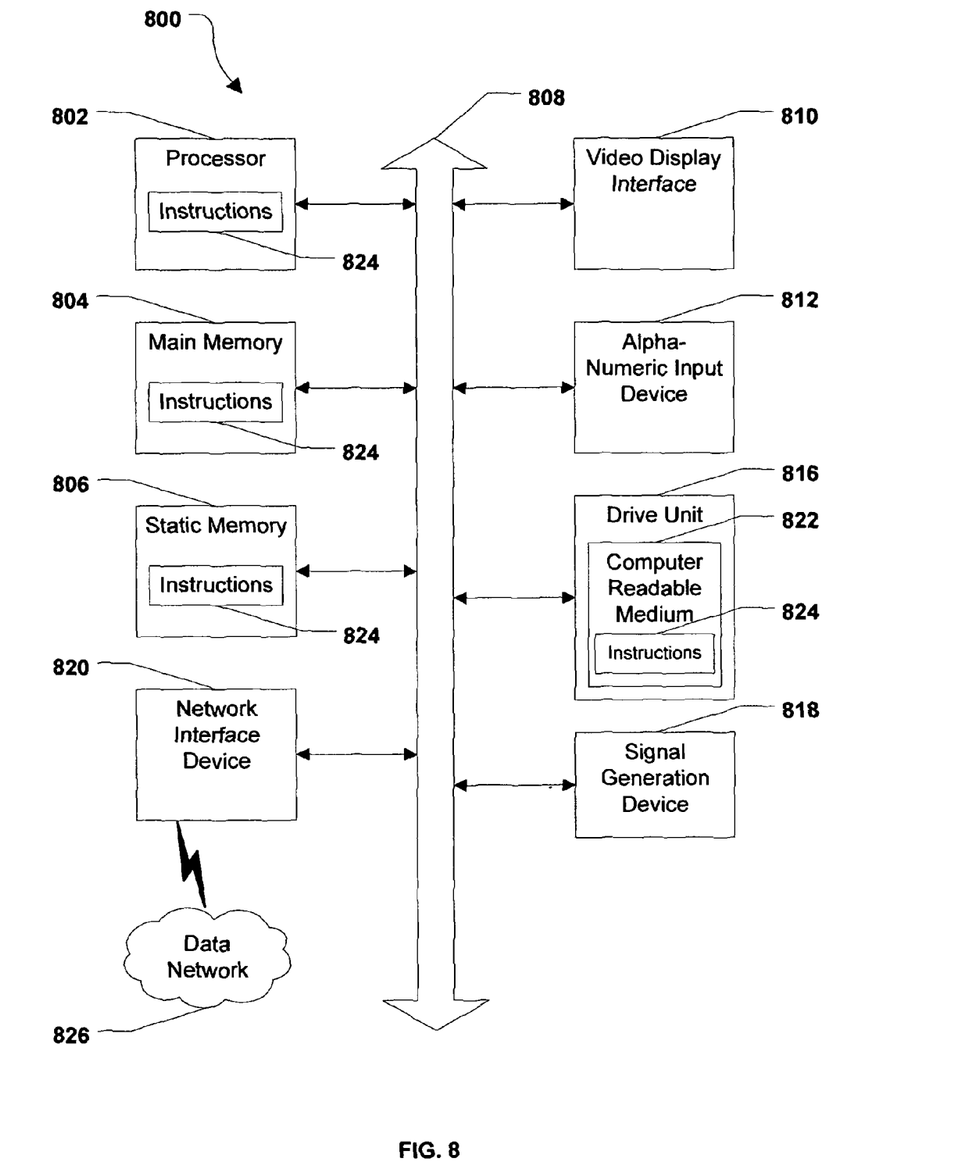
FIG. 8 is a diagram of an illustrative embodiment of a general computer system.

Referring to FIG. 8, an illustrative embodiment of a general computer system is shown and is designated 800. The computer system 800 can include a set of instructions that can be executed to cause the computer system 800, or a portion thereof, to perform any one or more of the methods or computer based functions disclosed herein. The computer system 800, or any portion thereof, may operate as a standalone device or may be a hardware or software module within a communication server, network address book server, or network address book data store, as illustrated in FIG. 1.

The computer system 800 can also be implemented as or incorporated into various other devices, such as the electronic devices illustrated in FIG. 1, or any other machine capable of executing a set of instructions (sequential or otherwise) that specify actions to be taken by that machine. In a particular embodiment, the computer system 800 can be implemented using electronic devices that provide audio, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics-processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a remote control input, an input control panel, a keyboard, a mouse, a gaming station input, or one or more keys disposed on a set-top box device. The computer system 800 can also include a disk drive unit 816, a signal generation device 818, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives instructions 824 responsive to a propagated signal, so that a device connected to a network 826 can communicate audio, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-implemented method of publishing contact information, the method comprising:
  receiving, at a server, a command to publish a collection of contacts to a plurality of recipients, wherein the collection of contacts is maintained by a network address book service associated with a network address book of a sender;
  receiving a distribution list that identifies the plurality of recipients;

determining whether each recipient of the plurality of recipients is a customer of the network address book service;

sending an automated message to each recipient of the plurality of recipients that is a non-customer of the network address book service, wherein the automated message includes an invitation to become a customer of the network address book service;

sending a notification from the server to each recipient of the plurality of recipients that is a customer of the network address book service, including any recipient that accepted the invitation to become a customer of the network address book service, wherein the notification includes an option to subscribe to the collection of contacts and an option to receive a preview of the collection of contacts;

converting the collection of contacts to one or more formats displayable by devices associated with recipients that subscribed to receive access to the collection of contacts, including any recipient that accepted the invitation to become a customer and subscribed to receive access to the collection of contacts; and sending the collection of contacts from the server to each recipient that subscribed to the collection of contacts, wherein the collection of contacts is sent to a device associated with a particular recipient in a format usable by the device.

2. The computer-implemented method of claim 1, further comprising retrieving the collection of contacts from an external data store that stores the network address book.

3. The computer-implemented method of claim 2, further comprising instructing the external data store to associate the collection of contacts with a network address book of a recipient that subscribes to the collection of contacts.

4. The computer-implemented method of claim 3, further comprising:
receiving updated contact information related to at least one contact in the collection of contacts from the sender; and
storing the updated contact information in the network address book of the recipient.

5. The computer-implemented method of claim 1, further comprising: prompting the sender for an e-mail address of at least one recipient that is a non-customer of the network address book service; and sending the automated message to the at least one recipient via the e-mail address for the at least one recipient.

6. The computer-implemented method of claim 1, wherein an entry of the collection of contacts includes a physical address, a telephone number, an e-mail address, a web address, a communications account identifier, or any combination thereof.

7. The computer-implemented method of claim 1, wherein a contact of the collection of contacts is a person, a group of persons, a church, a school, a government agency, or a business organization.

8. A system to publish contact information, the system comprising a server including a processor configured to:
receive a distribution list of a collection of contacts maintained by a network address book service at the server, wherein the distribution list is received from a sender;
determine whether each recipient in the distribution list is a customer of the network address book service;
prompt the sender for an email address of each recipient in the distribution list that is not a customer of the network address book service;
send an automated message to each email address received in response to the prompt, wherein the automated message includes an invitation to become a customer of the network address book service;
send a notification from the server to each recipient of the plurality of recipients that is a customer of the network address book service, including any recipient that accepted the invitation to become a customer of the network address book service, wherein the notification includes an option to subscribe to the collection of contacts and an option to receive a preview of the collection of contacts;
convert the collection of contacts to one or more formats displayable by devices associated with recipients that subscribed to receive access to the collection of contacts, including any recipient that accepted the invitation to become a customer of the network address book service and subscribed to receive access to the collection of contacts; and
send the collection of contacts from the server to each recipient that subscribed to the collection of contacts, wherein the collection of contacts is sent to a device associated with a particular recipient in a format usable by the device.

9. The system of claim 8, wherein the server is configured to send the collection of contacts as a read-only file to one or more customers of the network address book service that subscribe to the collection of contacts.

10. The system of claim 8, wherein:
the server is configured to send a notification to each recipient in the distribution list that is a customer of the network address book service via at least one electronic device associated with the recipient,
wherein the at least one electronic device includes a network address book application that enables the electronic device to communicate with the server and with an external data store that stores the network address book of the sender.

11. The system of claim 10, wherein the at least one electronic device comprises a personal computer, a laptop computer, a Voice-over Internet Protocol phone, a personal data assistant, a wireless phone, a wireline telephone, or any combination thereof.

12. A non-transitory computer-readable storage medium comprising operational instructions, that when executed by a processor, cause the processor to:
receive a command to publish a collection of contacts maintained by a network address book service to one or more recipients identified in a distribution list;
determine whether each recipient identified in the distribution list is a customer of the network address book service;
send an automated message to each recipient identified in the distribution list that is not a customer of the network address book service, wherein the automated message includes an invitation to become a customer of the network address book service;
send a notification to at least one electronic device associated with each recipient identified in the distribution list that is a customer of the network address book service, including any recipient that accepted the invitation to become a customer of the network address book service, wherein the notification includes an invitation to subscribe to receive access to the collection of contacts and an option to receive a preview of the collection of contacts before subscribing;

convert the collection of contacts to a format displayable by the at least one electronic device associated with a particular recipient that subscribed to receive access to the collection of contacts, wherein the particular recipient is one of a recipient that was determined to be a customer of the network address book service and a recipient that accepted the invitation to become a customer of the network address book service; and send the formatted collection of contacts to the at least one electronic device associated with the particular recipient.

13. The non-transitory computer-readable storage medium of claim 12, wherein the at least one electronic device includes a voice over internet protocol phone and wherein the formatted collection of contacts is displayable by the voice over internet protocol phone.

14. The non-transitory computer-readable storage medium of claim 12, wherein the at least one electronic device includes a wireless phone and wherein the formatted collection of contacts is displayable by the wireless phone.

15. The computer-implemented method of claim 1, wherein a name associated with the collection of contacts sent from the server is different than an initial name of the collection of contacts identified in the network address book of the sender.

* * * * *